(12) United States Patent
Louzoun et al.

(10) Patent No.: US 8,924,960 B2
(45) Date of Patent: Dec. 30, 2014

(54) ASSIGNMENT, AT LEAST IN PART, OF AT LEAST ONE VIRTUAL MACHINE TO AT LEAST ONE PACKET

(75) Inventors: Eliel Louzoun, Jerusalem (IL); Gregory D. Cummings, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1650 days.

(21) Appl. No.: 12/200,709

(22) Filed: Aug. 28, 2008

(65) Prior Publication Data

US 2010/0058336 A1 Mar. 4, 2010

(51) Int. Cl.
*G06F 12/08* (2006.01)
*H04L 29/08* (2006.01)
*G06F 12/00* (2006.01)
*G06F 9/54* (2006.01)
*G06F 9/50* (2006.01)
*G06F 9/455* (2006.01)

(52) U.S. Cl.
CPC .... *H04L 67/1002* (2013.01); *G06F 2009/4557* (2013.01); *G06F 12/00* (2013.01); *G06F 9/54* (2013.01); *G06F 2009/45595* (2013.01); *G06F 9/5077* (2013.01); *H04L 67/1014* (2013.01); *H04L 67/1023* (2013.01)
USPC .......................................................... 718/1

(58) Field of Classification Search
CPC ......... G06F 9/5077; G06F 9/54; G06F 12/00; G06F 2009/4557; G06F 2009/45595
USPC ............................................................ 718/1
See application file for complete search history.

(56) References Cited

U.S. PATENT DOCUMENTS

| 7,536,693 | B1 * | 5/2009 | Manczak et al. | 718/105 |
| 2007/0180436 | A1 * | 8/2007 | Travostino et al. | 717/138 |
| 2008/0254833 | A1 * | 10/2008 | Keevill et al. | 455/558 |

OTHER PUBLICATIONS

Srisuresh, P. "Traditional IP Network Address Translator (Traditional NAT)", Jasmine Networks, http://www.ietf.org/rfc/rfc3022.txt, (Jan. 2001), 21 pgs.
"Load balancing (computing)", http://en.wikipedia.org/wiki/Load_balancing_(computing),(Jul. 22, 2008), 8 pgs.

* cited by examiner

*Primary Examiner* — Robert Fennema
(74) *Attorney, Agent, or Firm* — Christopher K. Gagne (57) ABSTRACT

In an embodiment, an apparatus is provided that may include circuitry to be comprised in a platform. The circuitry may be to determine, at least in part, at least one virtual machine (VM) resident in the platform to be assigned to process, at least in part, at least one packet. The circuitry may determine, at least in part, the at least one VM based at least in part upon (1) comparison, at least in part, of at least one destination of the at least one packet to at least one predetermined destination, and (2) at least one value based at least in part upon both at least one port associated with the at least one packet and at least one source of the at least one packet. Of course, many alternatives, variations, and modifications are possible without departing from this embodiment.

16 Claims, 4 Drawing Sheets

ASSIGNMENT, AT LEAST IN PART, OF AT LEAST ONE VIRTUAL MACHINE TO AT LEAST ONE PACKET

FIELD

This disclosure relates to assignment, at least in part, of at least one virtual machine (VM) to at least one packet.

BACKGROUND

In one conventional network, a server farm includes a plurality of servers assigned a common network address. The load of processing packets arriving at the server farm is distributed between or among the servers by a front end switch or server in accordance with a network address translation technique. In this conventional technique, the destination network address of an incoming packet is modified by the front end switch or server. Disadvantageously, this consumes an undesirably large amount of processing bandwidth. Also, in this conventional arrangement, if one of the servers fails, its packet processing functions may be reassigned to another server in the server farm.

With the advent of virtualization, a plurality of virtual machines may be resident in a single physical server, and each of these virtual machines may be able to process received packets. It would be desirable to provide a technique to distribute the load of processing the received packets between or among the virtual machines that does not result in and/or involve as a consequence of implementing the technique the modification of the destination network addresses of the one or more packet, in order to reduce the amount of processing bandwidth consumed in processing the received packets.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
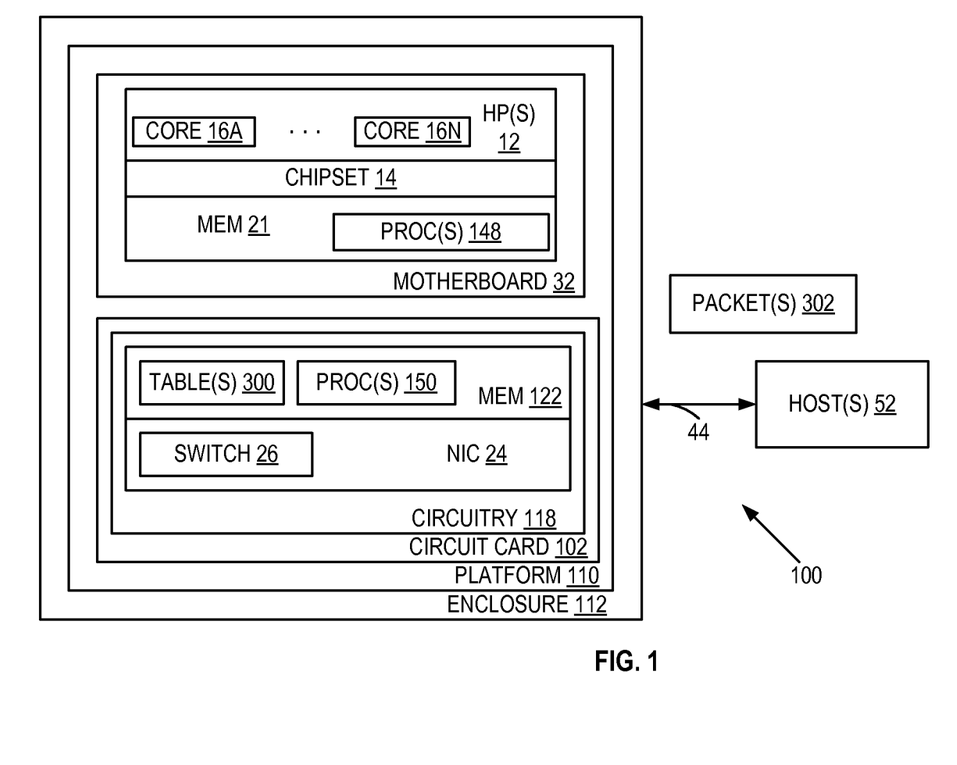
FIG. 1 illustrates a system embodiment.

FIG. 1 illustrates a system embodiment 100. System 100 comprises computer platform 110 that is communicatively coupled to one or more hosts 52 via one or more network communication links 44. Each of the one or more hosts 52 may have the same construction and/or operation as platform 110. Alternatively, one or more hosts 52 may have, in whole or in part, a different construction and/or a different operation from platform 110. Platform 110 and/or one or more hosts 52 may be or comprise one or more client and/or server systems.

Platform 110 may comprise circuit card 102 and motherboard 32. Motherboard 32 may comprise one or more host processors 12. One or more host processors 12 may comprise one or more (and in this embodiment, a plurality of) processor cores 16A ... 16N. One or more host processors 12 may be coupled (e.g., via a respective not shown segment of a proprietary bus) to a chipset 14. As used herein, a "processor" and/or "processor core" means circuitry capable of performing, at least in part, one or more arithmetic, Boolean, and/or logical operations. As used herein, "circuitry" may comprise, for example, singly or in any combination, analog circuitry, digital circuitry, hardwired circuitry, programmable circuitry, state machine circuitry, and/or memory that may comprise program instructions that may be executed by programmable circuitry. Additionally, as used herein, a first device may be "communicatively coupled" to a second device if the first device is capable of transmitting to and/or receiving from the second device one or more signals.

Chipset 14 may comprise a not shown memory controller hub that may couple one or more host processors 12, a system memory 21 and a not shown user interface system to each other and to a not shown bus system. Chipset 14 may comprise one or more integrated circuit chips selected from, for example, one or more integrated circuit chipsets available from the Assignee of the subject application (e.g., memory controller hub and input/output (I/O) controller hub chipsets), although one or more other integrated circuit chips may also, or alternatively be used, without departing from this embodiment. The not shown user interface system may comprise, e.g., a keyboard, pointing device, and display system that may permit a human user to input commands to, and monitor the operation of, system 100. The not shown bus system may comprise one or more buses that may comply with the bus protocol described in Peripheral Component Interconnect (PCI) Express™ Base Specification Revision 1.0, published Jul. 22, 2002, available from the PCI Special Interest Group, Portland, Oreg., U.S.A. Alternatively, the bus may comprise other types of bus systems, without departing from this embodiment.

Circuit card 102 may be communicatively coupled via one more links 44 to one or more hosts 52. Controller circuit card 102 may comprise operative circuitry 118. Operative circuitry 118 may comprise network interface controller (NIC) 24 and memory 122. NIC 24 may comprise switch 26. Alternatively, without departing from this embodiment, NIC 24 may comprise operative circuitry 118 and/or card 102.

One or more processors 12, system memory 21, and chipset 14 may be comprised in a single circuit board, such as, for example, system motherboard 32. Motherboard 32 also may comprise the not shown bus system and a not shown bus card slot. Card 102 may include a not shown bus connector that may be capable of being electrically and mechanically coupled to the bus card slot that may be comprised in the motherboard 32. When the bus connector of card 102 is so coupled to the bus card slot comprised in motherboard 32, operative circuitry 118 may become communicatively coupled to mother board 32.

Alternatively, without departing from this embodiment, some or all of the operative circuitry 118 of controller card 102 may not be comprised in card 102, but instead, may be comprised in other structures, systems, and/or devices. These other structures, systems, and/or devices may be, for example, comprised in motherboard 32 (e.g., as part of one or more host processors 12 and/or chipset 14). Also alternatively, one or more processors 12, chipset 14, memory 122, and/or circuitry 118 may be comprised, in whole or in part, in a single integrated circuit (such as, for example, a single integrated circuit chip).

One or more machine-readable program instructions may be stored in computer-readable memory 122 and/or 21. In operation of system 100, these instructions may be accessed and executed by circuitry 118, NIC 24, switch 16, one or more processor cores 16A ... 16N, and/or one or more host processors 12. When executed by circuitry 118, NIC 24, switch 16, one or more processor cores 16A ... 16N, and/or one or more host processors 12, these one or more instructions may result in circuitry 118, NIC 24, switch 16, one or more processor cores 16A ... 16N, and/or one or more host processors 12 performing the operations described herein as being performed by circuitry 118, NIC 24, switch 16, one or more processor cores 16A ... 16N, and/or one or more host processors 12. Also when executed by circuitry 118, NIC 24, switch 16, one or more processor cores 16A ... 16N, and/or one or more host processors 12, these one or more instructions may result in one or more software program processes 148 and/or 150 being executed, at least in part, by circuitry 118, NIC 24, switch 16, one or more processor cores 16A ... 16N, and/or one or more host processors 12, and/or becoming resident in memory 21 and/or 122. One or more processes 148 and/or 150 may be or comprise one or more VM management (VMM) processes. Computer-readable memory 21 and 122 may each comprise one or more of the following types of memories: semiconductor firmware memory, programmable memory, non-volatile memory, read only memory, electrically programmable memory, random access memory, flash memory, magnetic disk memory, and/or optical disk memory.

Figure 2:
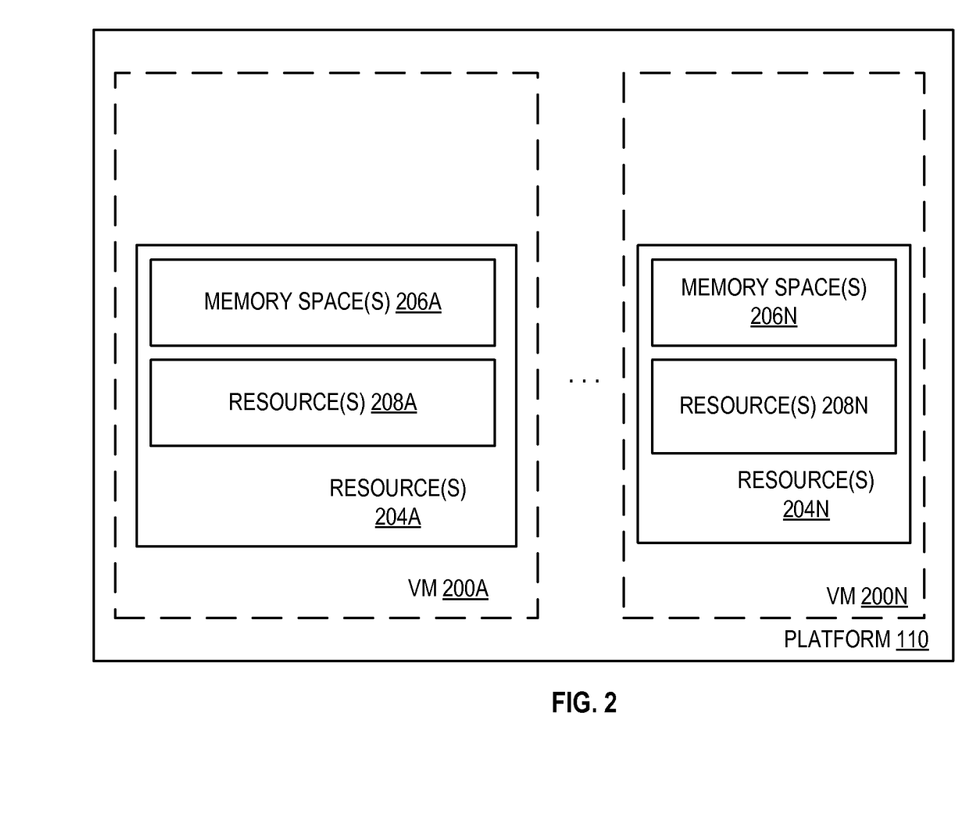
FIG. 2 illustrates virtual machines in an embodiment.

The execution of one or more processes 148 and/or 150 may result, at least in part, in one or more (and in this embodiment, a plurality of) virtual machines 200A ... 200N becoming resident in platform 110 (see FIG. 2). In this embodiment, a VM may be an association of one or more resources and/or one or more memory spaces. Multiple virtual machines may be executed by a single processor core (or portion thereof), and/or single VM may be executed by multiple processor cores. In this embodiment, a memory space may comprise one or more contiguous and/or non-contiguous, logical and/or physical regions of computer readable (and/or writeable) memory. For example, in this embodiment, the execution of one or more processes 148 and/or 150 may result, at least in part, in resources comprised in platform 110 being partitioned into a plurality of virtual machines 200A ... 200N. As shown in FIG. 2, each respective VM in platform 110 may comprise one or more resources (e.g., one or more respective memory spaces comprised in memory 21 and/or 122, and/or other resources in platform 110) that have been assigned to the respective VM by, at least in part, one or more processes 148 and/or 150. For example, VM 200A may comprise one or more resources 204A in platform 110, and VM 200N may comprise one or more resources 204N in platform 110. One or more resources 204A may comprise one or more memory spaces 206A and one or more other resources 208A (e.g., not shown I/O, communication, and/or storage resources comprised in platform 110). One or more resources 204N may comprise one or more memory spaces 206N and one or more other resources 208N (e.g., not shown I/O, communication, and/or storage resources comprised in platform 110). The resources 204A ... 204N may comprise processor core power resources.

In this embodiment, platform 110 may be comprised in a single physical housing or enclosure 112. Alternatively, the components of platform 110 may be comprised in a plurality of physical housings and/or enclosures without departing from this embodiment.

One or more links 44 may permit the exchange data and/or commands between platform 110 and one or more hosts 52 in accordance with, e.g., an Ethernet protocol and/or Transmission Control Protocol/Internet Protocol (TCP/IP) protocol. The Ethernet protocol utilized in system 100 may comply or be compatible with the protocol described in Institute of Electrical and Electronics Engineers, Inc. (IEEE) Std. 802.3, 2000 Edition, published on Oct. 20, 2000. Alternatively or additionally, the TCP/IP protocol utilized in system 100 may comply or be compatible with the protocols described in Internet Engineering Task Force (IETF) Request For Comments (RFC) 791 and 793, published September 1981. Of course, many different communication protocols may be used for such data and/or command exchange without departing from this embodiment.

With reference now being made to FIGS. 1 to 4, operations 400 (see FIG. 4) that may be performed in system 100 according to an embodiment will be described. After, for example, a reset of system 100 and/or platform 110, one or more hosts 52 may issue to platform 110 via one or more links 44 one or more packets 302. As used herein, a "packet" means one or more symbols and/or values. NIC 24 may receive, at least in part, one or more packets 302.

Figure 3:
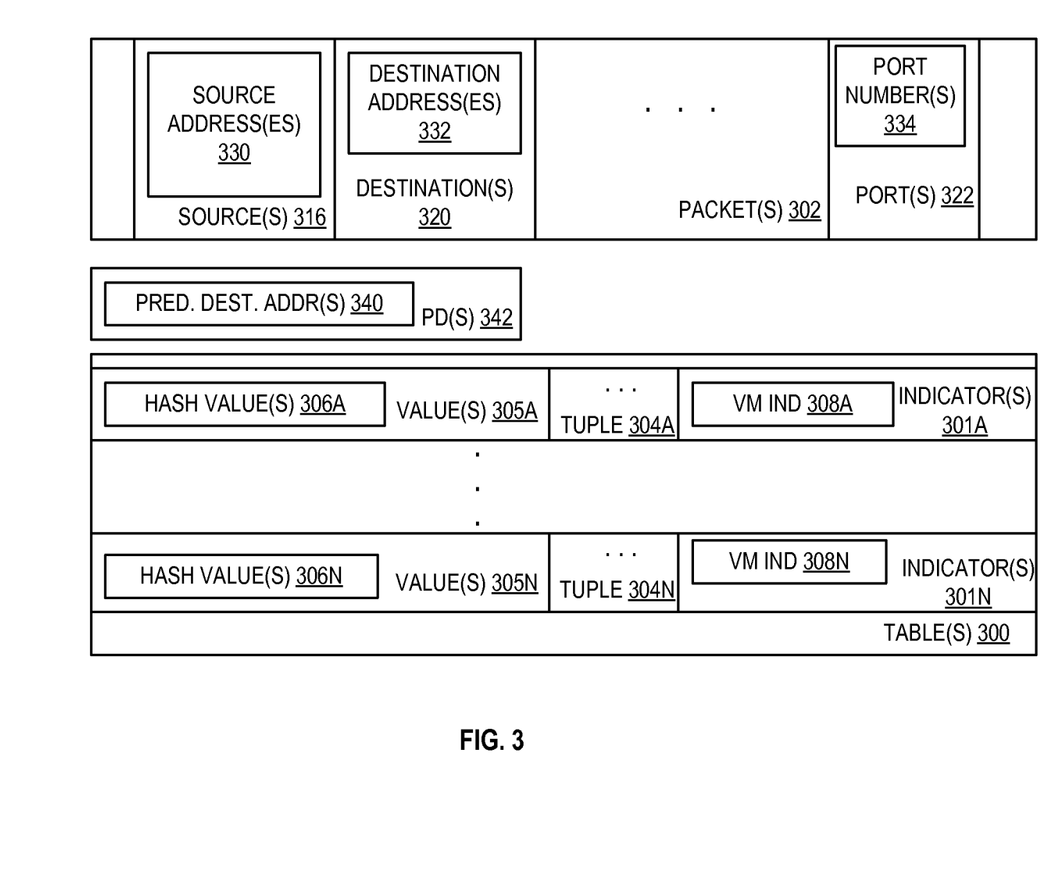
FIG. 3 illustrate one or more tables, one or more packets, and one or more predetermined destinations in an embodiment.

As shown in FIG. 3, one or more packets 302 may include a plurality of fields indicating, at least in part, one or more sources (shown symbolically in FIG. 3 by element 316) and/or destinations (shown symbolically in FIG. 3 by element 320) of the one or more packets 302, and/or one or more ports (shown symbolically in FIG. 3 by element 322) associated with the one or more packets 302. For example, one or more sources 316 of one or more packets 302 may be indicated, at least in part, in one or more source address fields (e.g., one or more source medium access control (MAC) and/or source network (e.g., IP) address fields) in one or more packets 302 by one or more source addresses (e.g., one or more source MAC and/or source network (e.g., IP) addresses) 330. One or more destinations 320 of one or more packets 302 may be indicated, at least in part, in one or more destination address fields (e.g., one or more destination MAC and/or destination network (e.g., IP) address fields) in one or more packets 302 by one or more destination addresses (e.g., one or more destination MAC and/or destination network (e.g., IP) addresses) 332. One or more ports 322 associated with one or more packets 302 may be indicated, at least in part, in one or more transport layer port fields (e.g., one or more TCP port fields) in one or more packets 302 by one or more TCP port numbers 334 that may identify, at least in part, the one or more ports 322.

Figure 4:
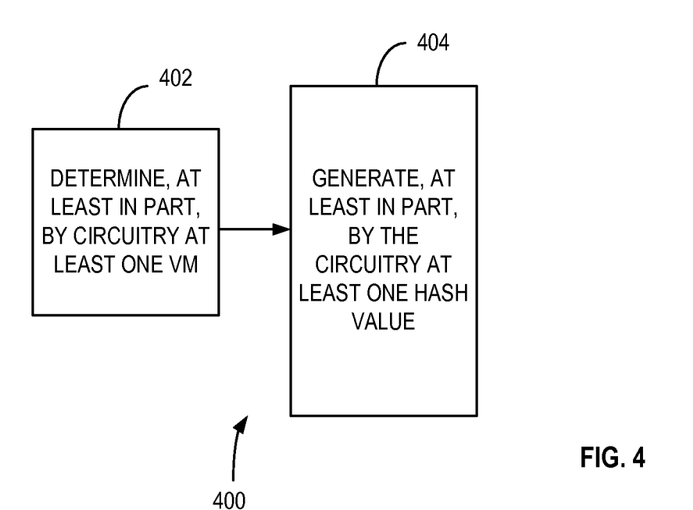
FIG. 4 illustrates a flowchart of operations in an embodiment.

After receipt of one or more packets 302 by NIC 24, the execution of one or more processes 148 and/or 150 may result, at least in part, in circuitry 118, NIC 24, and/or switch 26 determining, at least in part, at least one VM (e.g., VM 200A) comprised in the plurality of virtual machines 200A ... 200N to be assigned to process, at least in part, the one or more packets 302, as illustrated by operation 402 in FIG. 4. In this embodiment, this determination, at least in part, by circuitry 118, NIC 24, and/or switch 26 may be based, at least in part, upon (1) comparison, at least in part, of at least one destination 320 of the one or more packets 302 to at least one predetermined destination (shown symbolically in FIG. 3 by element 342), and (2) at least one value based at least in part upon both one or more ports 322 associated with one or more packets 302 and one or more sources 316 of one or more packets 302.

For example, in this embodiment, the one or more predetermined destinations 342 may be, be identified by, be associated with, or comprise, at least in part, one or more predetermined destination addresses (e.g., one or more predetermined destination MAC and/or predetermined destination network (e.g., IP) addresses) 340 assigned to, comprising, and/or associated with platform 110, circuitry 118, NIC 24, and/or switch 26. The one or more predetermined destinations 342 and/or destination addresses 340 may be for the purpose, at least in part, and/or among other things, of exposing to one or more hosts 52 one or more destination addresses that may designate, at least in part, the plurality of virtual machines 200A ... 200N resident in platform 110 as a single collective logical network destination. Other and/or additional destination addresses may be assigned to one or more respective virtual machines 200A ... 200N, and/or other and/or additional components of platform 110 that may not be shared, at least in part, among the virtual machines 200A ... 200N (e.g., these other and/or additional destination addresses may separately designate and/or address one or more respective virtual machines resident in platform 110 and/or other and/or additional components of platform 110).

After a reset of platform 110, the execution of one or more processes 148 and/or 150 may result, at least in part, in one or more tables 300 being stored in memory 122 (or alternatively or additionally in memory 21, at least in part) by circuitry 118, NIC 24, and/or switch 26. One or more tables 300 may comprise one or more (and in this embodiment, a plurality of) tuples 304A ... 304N (see FIG. 3). The tuples 304A ... 304N may respectively associate a plurality of values 305A ... 305N with a plurality of indicators 301A ... 301N. The one or more respective values 305A ... 305N in each respective tuple 304A ... 304N may comprise one or more respective hash values 306A ... 306N. The one or more respective indicators 301A ... 301N in each respective tuple 304A ... 304N may comprise one or more respective VM indexes 308A ... 308N.

Each of the indicators 301A ... 301N and/or each of the VM indexes 308A ... 308N may indicate and/or identify, at least in part, one or more respective virtual machines resident in platform 110. In this embodiment, each respective VM resident in platform 110 may be assigned and be indicated by, at least in part, one or more respective indicators and/or one more respective VM indexes in one or more tables 300. Each of the values 305A ... 305N may be generated by circuitry 118, NIC 24, and/or switch 26 based, at least in part, upon one or more respective ports (and/or one or more respective port numbers) and one or more respective sources (and/or one or more respective source addresses) from one or more respective packets that may be (or may have been) received by platform 110. Each of the hash values 306A ... 306N may be generated by circuitry 118, NIC 24, and/or switch 26 based, at least in part, upon hashing of one or more respective ports (and/or one or more respective port numbers) and one or more respective sources (and/or one or more respective source addresses) from one or more respective packets that may be (or may have been) received by platform 110.

After receipt of one or more packets 302 by NIC 24, the execution of one or more processes 148 and/or 150 may result, at least in part, as part of operation 402, in circuitry 118, NIC 24, and/or switch 26 comparing, at least in part, one or more destinations 320 and/or one or more destination addresses 322 with one or more predetermined destinations 342 and/or one or more predetermined destination addresses 340. If one or more destinations 320 and/or one or more destination addresses 322 do not match, in whole or in part, one or more predetermined destinations 342 and/or one or more predetermined destination addresses 340, circuitry 118, NIC 24, and/or switch 26 may process, at least in part, one or more packets 302 in accordance with, at least in part, other and/or additional techniques from those described herein.

Conversely, if one or more destinations 320 and/or one or more destination addresses 322 match, in whole or in part, one or more predetermined destinations 342 and/or one or more predetermined destination addresses 340, circuitry 118, NIC 24, and/or switch 26 may perform one or more hashing and/or other operations involving and/or based, at least in part, upon one or more sources 316 (and/or one or more source addresses 330) and one or more ports 322 (and/or one or more port numbers 334), as illustrated by operation 404 in FIG. 4. Circuitry 118, NIC 24, and/or switch 26 may compare the one or more hash values (and/or other values) that may result from these one or more operations to one or more values 305A ... 305N and/or one or more hash values 306A ... 306N in one or more tables 300. If the one or more hash values (and/or other values) that may result from these one or more operations do not match, at least in part, one or more values 305A ... 305N and/or one or more hash values 306A ... 306N, one or more processes 148 and/or 150 may assign (in accordance, at least in part, with at least one algorithm to balance, at least in part, packet processing load between or among virtual machines 200A ... 200N, at least one (e.g., VM 200A) of the virtual machines 200A ... 200N to process, at least in part, one or more packets 302. Circuitry 118, NIC 24, and/or switch 26 may insert into one or more tables 300 a new tuple (not shown) that may associate the one or more hash values (and/or other values) that may result from these one or more hashing and/or other operations comprised in operation 404 with one or more indicators and/or one or more VM indexes that may indicate, at least in part, the at least one VM 200A that may be assigned to process, at least in part, the one or more packets 302. Circuitry 118, NIC 24, and/or switch 26 may route the one or more packets 302 to the at least one VM 200A that may be assigned to process, at least in part, the one or more packets 302. The one or more destinations 320 and/or one or more destination addresses 320 in one or more packets 302, as routed to the at least one VM 200A by circuitry 118, NIC 24, and/or switch 26, are unchanged from those comprised in the one or more packets 302 as received by NIC 24 from one or more hosts 52.

Conversely, if the one or more hash values (and/or other values) that may result from these one or more hashing and/or other operations comprised in operation 404 matches, at least in part, one or more of the values 305A ... 305N and/or 306A ... 306N (e.g., one or more values 305A and/or 306A), the execution of one or more processes 148 and/or 150 may result in circuitry 118, NIC 24, and/or switch 26 determining, at least in part, at least one (e.g., VM 200A) of the virtual machines 200A ... 200N that is indicated, at least in part, by one or more indicators (e.g., one or more indicators 301A) and/or one or more VM indexes (e.g., one or more VM indexes 308A) that is associated with these one or more matching values 305A and/or 306A in one or more tuples (e.g., tuple 304A) in one or more tables 300. The execution of one or more processes 148 and/or 150 may result in circuitry 118, NIC 24, and/or switch 26 assigning to the VM 200A indicated, at least in part, by one or more indicators 301A and/or one or more VM indexes 308A the one or more packets 302 to process, at least in part, the one or more packets 302. Circuitry 118, NIC 24, and/or switch 26 may route the one or more packets 302 to the at least one VM 200A that may be assigned to process, at least in part, the one or more packets 302. The one or more destinations 320 and/or one or more destination addresses 320 in one or more packets 302, as routed to the at least one VM 200A by circuitry 118, NIC 24, and/or switch 26, are unchanged from those comprised in the one or more packets 302 as received by NIC 24 from one or more hosts 52.

Thus, in essence, each of the tuples 304A . . . 304N represents and/or embodies a respective pre-assignment to one or more respective virtual machines in platform 110 to process, at least in part, one or more respective packet flows identifiable, at least in part, by one or more values 305A . . . 305N and/or 306A . . . 306N, and/or at least in part by the respective sources, source addresses, ports, and/or port numbers based upon which, at least in part, these values where generated, at least in part. In this embodiment, the respective values 305A . . . 305N, hash values 306A . . . 306N, indicators 301A . . . 301N, and VM indexes 308A . . . 308N may be associated together in respective tuples 304A . . . 304N in one or more tables 300 in accordance, at least in part, with at least one algorithm to balance, at least in part, packet processing load for expected and/or actual flows of received packets between or among the virtual machines 200A . . . 200N (at least with respect to those flows corresponding, at least in part, to the one or more predetermined destinations 342 and/or one or more predetermined destination addresses 340). That is, the respective associations of these values, hash values, indicators, and/or VM indexes into respective tuples in one or more tables 300 may be carried out in accordance with, at least in part, one or more packet processing loading balancing algorithms, in such a way as to balance, in whole or in part, the respective packet processing loads of the virtual machines 200A . . . 200N for actual and/or expect packet flows received by the platform 110 (at least for those flows corresponding to the one or more predetermined destinations 342 and/or one or more predetermined destination addresses 340).

If at least one (e.g., VM 200A) of the virtual machines 200A . . . 200N fails (e.g., no longer operates or no longer operates properly), the one or more processes 148 and/or 150 may remove from one or more tuples (e.g., tuple 304A) in one or more tables 300 one or more indicators 301A and/or one or more VM indexes 308A indicating, at least in part, the at least one failed VM 200A. The one or more processes 148 and/or 150 may insert in tuple 304A, in association with one or more values 305A and/or 306A, in place of one or more indicators 301A and/or one or more VM indexes 308A, one or more other indicators (e.g., one or more indicators 301N) and/or one or more other VM indexes (e.g., one or more VM indexes 308N) that may indicate, at least in part, at least one other VM (e.g., VM 200N) that may be assigned to process the one or more packets flows corresponding to one or more values 305A and/or 306A.

Thus, in an embodiment, an apparatus is provided that may include circuitry to be comprised in a platform. The circuitry may be to determine, at least in part, at least one VM resident in the platform to be assigned to process, at least in part, at least one packet. The circuitry may determine, at least in part, the at least one VM based at least in part upon (1) comparison, at least in part, of at least one destination of the at least one packet to at least one predetermined destination, and (2) at least one value based at least in part upon both at least one port associated with the at least one packet and at least one source of the at least one packet. Advantageously, in accordance with this embodiment, a technique is provided (and is implemented in this embodiment) that distributes, at least in part, the load of processing one or more received packets between or among virtual machines in a platform, which technique does not result in and/or involve as a consequence of implementing the technique the modification of the destination network addresses of the one or more packets. Advantageously, this permits the amount of processing bandwidth consumed in processing the received packets to be reduced in this embodiment compared to the prior art.

The terms and expressions employed herein are used as terms of description and not of limitation, and there is no intention, in the use of such terms and expressions, of excluding any equivalents of the features shown and described (or portions thereof), and various modifications are possible. Many other alternatives, modifications, and variations are possible without departing from this embodiment.

What is claimed is:

1. An apparatus comprising:
circuitry comprised in a circuit card to be comprised in a platform, the circuit card comprising a network interface controller that comprises a switch and first memory, the platform comprising a motherboard that includes second memory and at least one host processor to execute at least one process, execution of the at least one process by the at least one host processor resulting in at least one table being stored in the first memory and the second memory, the at least one table including tuples to be used by the switch to determine at least one virtual machine (VM) resident in the platform that is to be assigned to process at least one packet received by the network interface controller, the at least one VM being selected by the switch from among a plurality of virtual machines resident in the platform, the plurality of virtual machines becoming resident in the platform as a result of the execution of the at least one process by the at least one host processor, the platform being comprised in a single physical housing;
the switch being to determine the at least one VM based at least in part upon:
comparison of at least one destination of the at least one packet to at least one predetermined destination, the at least one destination being indicated by at least one destination address in the at least one packet;
at least one hash value based at least in part upon both at least one port associated with the at least one packet and at least one source of the at least one packet, the at least one hash value to be stored in at least one of the tuples by the switch; and
at least one VM index indicating the at least one VM, the at least one VM index to be stored in the at least one of the tuples by the switch; and
the switch being to route the at least one packet to the at least one VM, the at least one destination address in the at least one packet, as routed to the at least one VM by the switch, being unchanged from that received by the network interface controller;
wherein respective hash values and respective VM indexes are to be associated in respective of the tuples in accordance with, at least in part, at least one packet processing load balancing algorithm so as to balance, at least in part, respective virtual machine packet processing loads for actual and expected packet flows received by the platform.

2. The apparatus of claim 1, wherein:
the at least one packet includes at least one source address identifying, at least in part, the at least one source;
the at least one packet also includes at least one port number identifying, at least in part, the at least one port; and
the circuitry is to generate, at least in part, the at least one hash value based at least in part upon the at least one port number and the at least one source address.

3. The apparatus of claim 2, wherein:
the at least one hash value is associated with at least one indicator that indicates the at least one VM.

4. The apparatus of claim 3, wherein:
the motherboard comprises a plurality of processor cores; and
at least one of the processor cores is assigned to the at least one virtual machine.

5. The apparatus of claim 4, wherein:
the at least one table associates a plurality of hash values with a plurality of indicators, the plurality of indicators indicating the plurality of virtual machines resident in the platform, the at least one hash value being comprised in the plurality of hash values, and the plurality of indicators comprising the at least one indictor.

6. The apparatus of claim 5, wherein:
if the at least one destination of the at least one packet matches the at least one predetermined destination, the switch is to:
generate, at least in part, the at least one hash value;
determine the at least one indicator that is associated with the at least one hash value in the at least one table; and
route the at least one packet to the at least one VM indicated by the at least one indicator.

7. The apparatus of claim 6, wherein:
if the at least one VM fails, the at least one process is to remove the at least one indicator from the at least one table, and to associate in the at least one table at least one other indicator with the at least one hash value, the at least one other indicator indicating at least one other VM.

8. Non-transitory computer-readable memory storing one or more instructions that when executed by a machine result in execution of operations comprising:
determining by a switch comprised in a network interface controller that is comprised in circuitry that is comprised in a circuit card to be comprised in a platform at least one virtual machine (VM) resident in the platform that is to be assigned to process at least one packet received by the network interface controller, the circuit card also comprising a first memory, the platform comprising a motherboard that includes second memory and at least one host processor to execute at least one process, execution of the at least one process by the at least one host processor resulting in at least one table being stored in the first memory and the second memory, the at least one table including tuples to be used by the switch to carry out the determining, the at least one VM being selected by the switch from among a plurality of virtual machines resident in the platform, the plurality of virtual machines becoming resident in the platform as a result of the execution of the at least one process by the at least one host processor, the platform being comprised in a single physical housing;
the determining being based at least in part upon:
comparison of at least one destination of the at least one packet to at least one predetermined destination, the at least one destination being indicated by at least one destination address in the at least one packet;
at least one hash value based at least in part upon both at least one port associated with the at least one packet and at least one source of the at least one packet, the at least one hash value to be stored in at least one of the tuples by the switch; and
at least one VM index indicating the at least one VM, the at least one VM index to be stored in the at least one of the tuples by the switch; and
routing, by the switch, the at least one packet to the at least one VM, the at least one destination address in the at least one packet, as routed to the at least one VM by the switch, being unchanged from that received by the network interface controller;
wherein respective hash values and respective VM indexes are to be associated in respective of the tuples in accordance with, at least in part, at least one packet processing load balancing algorithm so as to balance, at least in part, respective virtual machine packet processing loads for actual and expected packet flows received by the platform.

9. The computer-readable memory of claim 8, wherein:
the at least one packet includes at least one source address identifying, at least in part, the at least one source;
the at least one packet also includes at least one port number identifying, at least in part, the at least one port; and
the operations further comprise generating, at least in part, by the circuitry the at least one hash value based at least in part upon the at least one port number and the at least one source address.

10. The computer readable memory of claim 9, wherein:
the at least one hash value is associated with at least one indicator that indicates the at least one VM.

11. The computer readable memory of claim 10, wherein:
the motherboard comprises a plurality of processor cores; and
at least one of the processor cores is assigned to the at least one virtual machine.

12. The computer readable memory of claim 11, wherein:
the at least one table associates a plurality of hash values with a plurality of indicators, the plurality of indicators indicating the plurality of virtual machines resident in the platform, the at least one hash value being comprised in the plurality of hash values, and the plurality of indicators comprising the at least one indictor.

13. The computer readable memory of claim 12, wherein:
if the at least one destination of the at least one packet matches the at least one predetermined destination, the switch is to:
generate, at least in part, the at least one hash value;
determine the at least one indicator that is associated with the at least one hash value in the at least one table; and
route the at least one packet to the at least one VM indicated by the at least one indicator.

14. The computer readable memory of claim 13, wherein:
if the at least one VM fails, at least one process is to remove the at least one indicator from the at least one table, and to associate in the at least one table at least one other indicator with the at least one hash value, the at least one other indicator indicating at least one other VM.

15. The apparatus of claim 1, wherein:
the at least one process comprises at least one VM management process.

16. The computer readable memory of claim 8, wherein:
the at least one process comprises at least one VM management process.

* * * * *

UNITED STATES PATENT AND TRADEMARK OFFICE
CERTIFICATE OF CORRECTION

| | | |
|---|---|---|
| PATENT NO. | : 8,924,960 B2 | Page 1 of 1 |
| APPLICATION NO. | : 12/200709 | |
| DATED | : December 30, 2014 | |
| INVENTOR(S) | : Eliel Louzoun et al. | |

It is certified that error appears in the above-identified patent and that said Letters Patent is hereby corrected as shown below:

In the Claims,

In column 9, line 15, in claim 5, delete "indictor" and insert -- indicator --, therefor.

In column 10, line 41, in claim 12, delete "indictor" and insert -- indicator --, therefor.

Signed and Sealed this
Seventh Day of July, 2015

Michelle K. Lee
*Director of the United States Patent and Trademark Office*